United States Patent
Jana et al.

(10) Patent No.: US 9,306,816 B2
(45) Date of Patent: Apr. 5, 2016

(54) SYSTEM AND METHOD FOR REPLAYING NETWORK CAPTURES

(71) Applicant: Ixia, Calabasas, CA (US)

(72) Inventors: Suryya Kumar Jana, Kolkata (IN); Rudranil Das, Kolkata (IN); Mithun Kumar Halder, Kolkata (IN); Tanmoy Sinha, Kolkata (IN)

(73) Assignee: Ixia, Calabasas, CA (US)

( * ) Notice: Subject to any disclaimer, the term of this patent is extended or adjusted under 35 U.S.C. 154(b) by 273 days.

(21) Appl. No.: 14/140,257

(22) Filed: Dec. 24, 2013

(65) Prior Publication Data

US 2015/0180743 A1   Jun. 25, 2015

(51) Int. Cl.
 *G06F 15/177* (2006.01)
 *H04L 12/26* (2006.01)
 *G06F 3/0484* (2013.01)

(52) U.S. Cl.
 CPC .......... *H04L 43/045* (2013.01); *G06F 3/04842* (2013.01); *H04L 43/18* (2013.01); *H04L 43/50* (2013.01)

(58) Field of Classification Search
 CPC .................................................... H04L 43/045
 USPC ........................................................ 715/736
 See application file for complete search history.

(56) References Cited

U.S. PATENT DOCUMENTS

| | | | | |
|---|---|---|---|---|
| 7,162,698 | B2 * | 1/2007 | Huntington | H04L 12/2602 709/224 |
| 7,747,954 | B2 * | 6/2010 | Farid | H04L 12/2697 709/224 |
| 9,001,668 | B2 * | 4/2015 | Gintis | H04L 43/045 370/241 |
| 9,021,362 | B2 * | 4/2015 | Broda | G06F 11/3495 715/736 |
| 9,148,358 | B2 * | 9/2015 | Breslin | H04L 12/26 |
| 2003/0151619 | A1 * | 8/2003 | McBride | H04L 41/145 715/736 |
| 2004/0111507 | A1 * | 6/2004 | Villado | H04L 12/2602 709/224 |
| 2010/0050084 | A1 * | 2/2010 | Knapp | H04L 12/18 715/736 |
| 2010/0218104 | A1 * | 8/2010 | Lewis | G06Q 10/04 715/736 |
| 2011/0211593 | A1 * | 9/2011 | Pepper | H04L 43/028 370/474 |

\* cited by examiner

*Primary Examiner* — William Titcomb (74) *Attorney, Agent, or Firm* — SoCal IP Law Group LLP; M. Kala Sarvaiya; Steven C. Sereboff (57) ABSTRACT

There is disclosed a system and method for replaying a network capture comprising loading a network capture file that displays at least one traffic flow comprising a sequence of packets, selecting at least one packet to display on a viewer and transmitting the network traffic to a device under test wherein the selected packet is displayed on the viewer when the packet is transmitted to the device under test.

13 Claims, 4 Drawing Sheets

SYSTEM AND METHOD FOR REPLAYING NETWORK CAPTURES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to receiving, processing and replaying traffic for testing a network or network device.

2. Description of the Related Art

Datacenter devices generate and test heavy traffic loads that are typical of realistic networks. At times when devices are being tested, it is desirable to replay (or re-perform) a set of data traffic that was used to test a network. However, there exists a difficulty in communications networks in replaying various types of traffic. Specifically, there exists a difficulty in replaying TCP captures having multiple HTTP requests and responses in a TCP session. Each HTTP requests/responses in a TCP session from client to device under test may be sent to multiple TCP sessions from device under test to server. Challenge is that replay module is stateless and does not have knowledge of any protocol.

In some test environments, administrators want to replay portions of streams having multiple requests/responses that were transmitted through the network. Usually multiple servers need to serve each of these requests in order to determine the source of a particular error or other problem in the device under test in between the clients and the servers. Some test environments may be configured with a secure connection between a client and a device under test, while having multiple persistent connections between a device under test and the servers. In such configurations, when a client is transmitting data, such as HTTP requests, a server may receive each of these requests in any of its opened persistent TCP connections in any order. In such environments, servers have difficulty identifying correct response to be chosen out of multiple responses against an incoming request.

In many types of communications networks, each message to be sent may be divided into portions of fixed or variable length. Each portion may be referred to as a packet, a frame, a cell, a datagram, a data unit, or other unit of information, all of which are referred to herein as packets.

Each packet may contain all or a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, and layer 4 of the structure are the physical layer, the data link layer, the network layer, and the transport layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

A TCP connection is defined by a pair of IP Addresses (fields in the IP header of each packet of the TCP connection) and a pair of TCP Ports (fields in the TCP header of each TCP packet). TCP Ports define what higher level protocol or process is using the services of the TCP connection. TCP Ports should not be confused with hardware ports (connections between hardware devices and a network). The header of each TCP packet contains a sequence number identifying the first data byte in the TCP packet, and an acknowledgement number identifying the next data byte expected to be received. The sequence and acknowledgement numbers are, in simplified terms, a count of the number of data bytes sent and received, respectively, over the TCP connection. Two devices communicating via a TCP connection maintain data indicating the highest sequence number transmitted and the highest acknowledgement number received. This information can be used to retransmit packets that are not acknowledged in a timely manner.

Layer 7, or application layer, protocols include the HyperText Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "device under test" (DUT) encompasses one or more network devices within a packet switched communications network. In order to test a DUT, test traffic comprising a large number of packets may be generated and transmitted to and/or through the DUT at one or more ports. Return test traffic transmitted through and/or from the DUT may be received at different ports. In this context, the term "port" refers to a logical entity coupled to the DUT by a communications path. The term "port unit" refers to a module within the network test equipment that connects to the DUT at a port. Thus a "port" encompasses a physical "port unit" and the data and parameters that define and constrain the operation of the port unit during a test session. Each port connected to the DUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a DUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the DUT operates at a higher layer of the network structure (for example, when the DUT is or includes a server, a server load balancer, a firewall, a network security device that performs packet inspection, or similar network devices), the test traffic may include or be a large plurality of TCP connections of a larger number of application layer transactions (e.g. HTTP GET transactions).

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

In order to diagnose problems in a network under test or in a test system, packets may be captured or stored for later analysis. For example, TCP packets may be stored to allow diagnosis of problems such as excessive retransmissions or unexpected connection terminations. Traditionally, entire received packets were stored in memory. This approach, however, requires a substantial amount of memory. Further, a time consuming search operation must be performed to retrieve packets associated with a specific TCP connection. Even if the number of packets to be stored is reduced by hardware or software filters, the amount of memory required to store more than a few seconds of received test traffic may be prohibitive. Additionally, memory bus throughput and memory latency limit the rate at which packets can be captured, thus reducing the performance of the test system.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
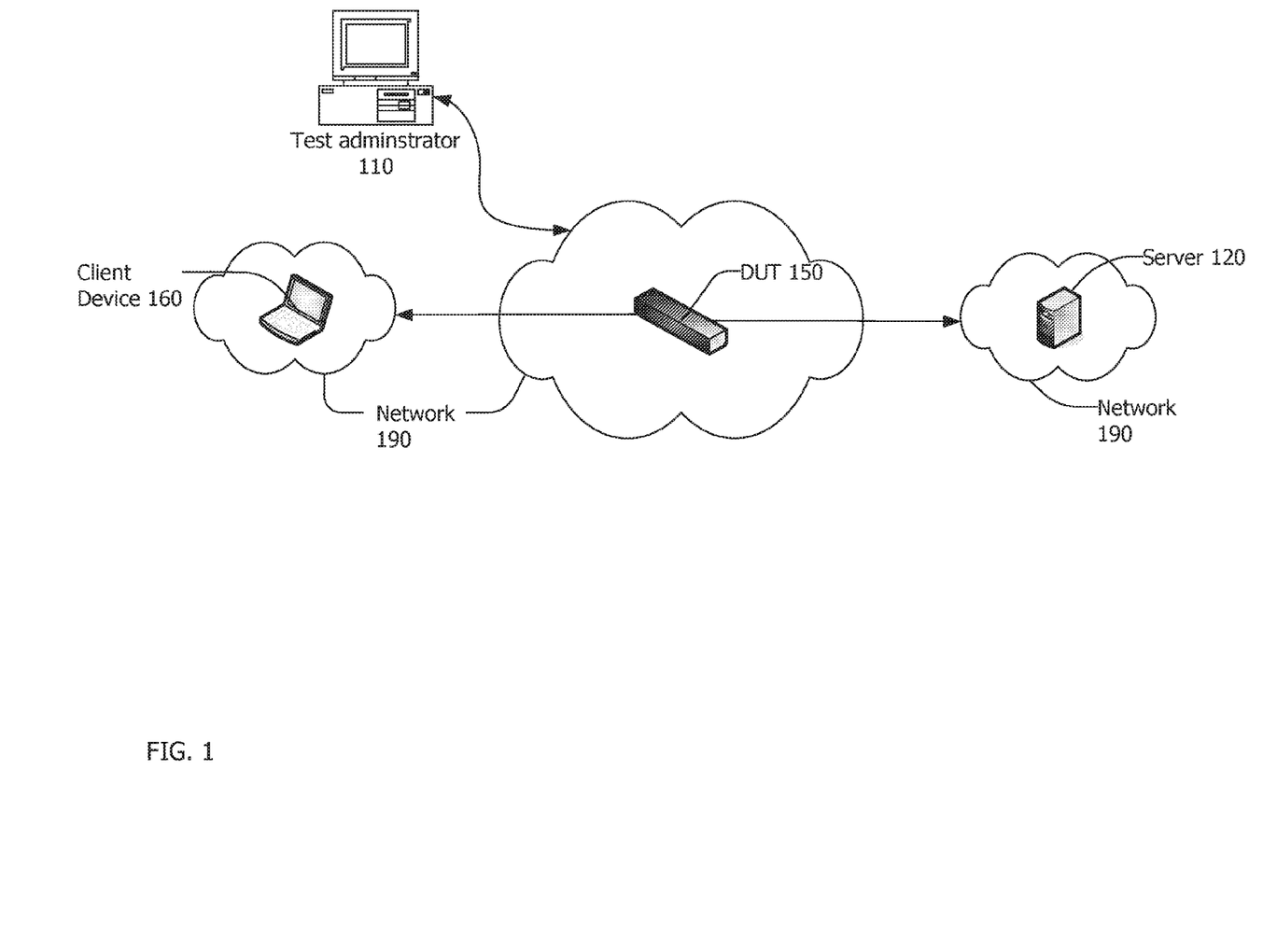
FIG. 1 is a block diagram of a network environment.

FIG. 1 shows a block diagram of a network environment 100 for replaying network captures in a testing environment on a datacenter device. Replayed network captures comprise packets and associated responses from traffic flows that were transmitted previously on a network and are being replayed on a network after being captured and stored. The environment may include a test administrator 110, server 120, a device under test (DUT) 150, a client device 160 and a network 190. For ease of description, the DUT 150 of FIG. 1 is coupled to a single client device and a single server. The DUT in an actual testing environment may be connected to a large number of emulated client devices and a large number of emulated servers.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets.

Various types of network traffic may be generated to emulate realistic traffic load conditions on the network environment 100. Traffic that is generated on a network may be collected and stored to be replayed at a later time.

Figure 2:
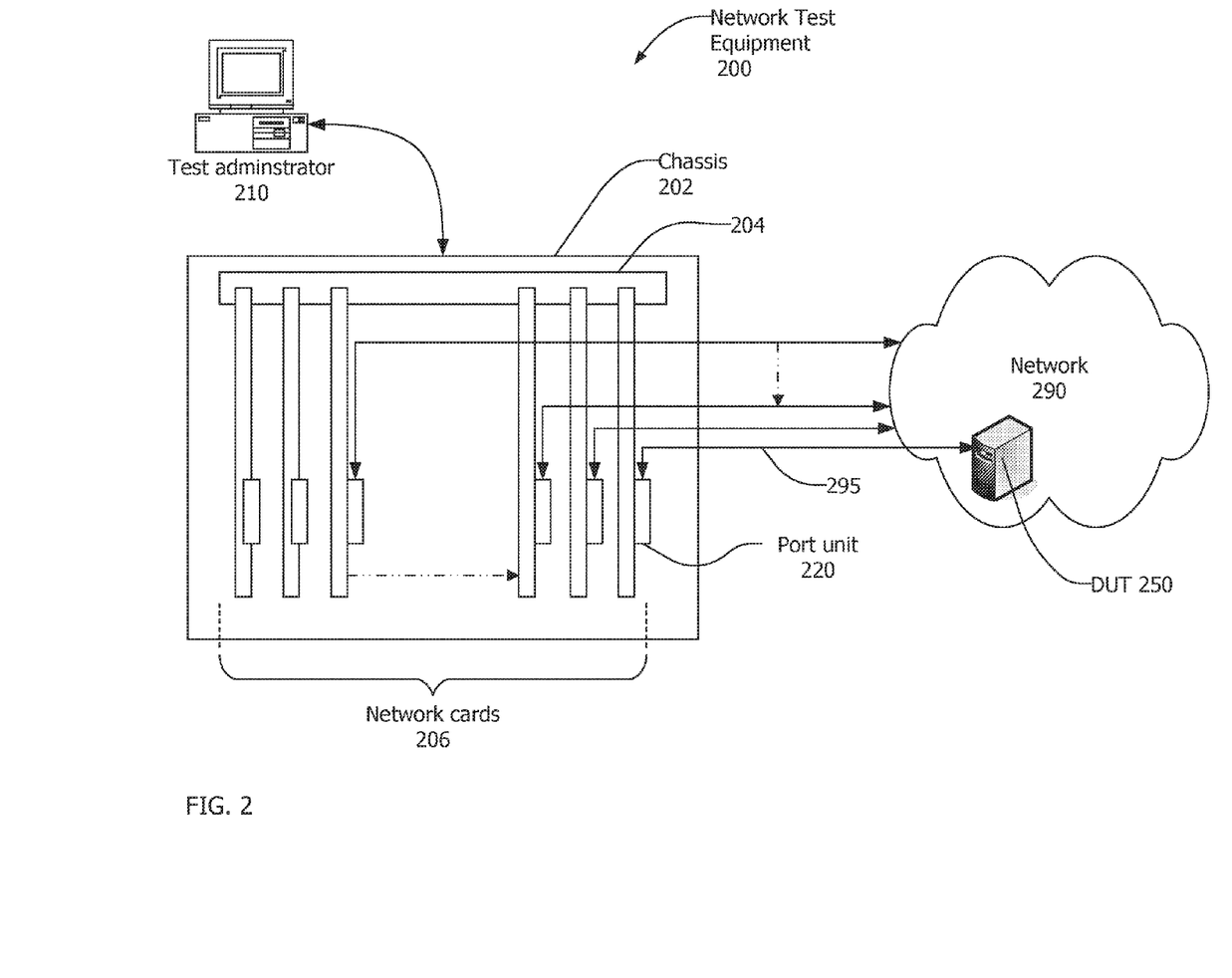
FIG. 2 is a block diagram of a test environment.

FIG. 2 shows a block diagram of a network environment. The environment may include network test equipment 200 and a network 290 which includes one or more devices under test (DUT) 250. The DUT 250 may be any device capable of communicating over the network 290.

The network test equipment 200 may be a network testing device, performance analyzer, conformance validation system, network analyzer, or network management system. The network test equipment 200 may include one or more network cards 206 and a backplane 204 contained or enclosed within a chassis 202. The chassis 202 may be a fixed or portable chassis, cabinet, or enclosure suitable to contain the network test equipment. The network test equipment 200 may be an integrated unit, as shown in FIG. 2. Alternatively, the network test equipment 200 may comprise a number of separate units cooperative to provide traffic generation and/or analysis. The network test equipment 200 and the network cards 206 may support one or more well known standards or protocols such as the various Ethernet and Fibre Channel standards, and may support proprietary protocols as well. The network test equipment 200 and the device under test 250 may communicate simultaneously with one another, and there may be plural logical communications paths between the network test equipment 200 and a device under test 250. The network itself may be comprised of numerous nodes providing numerous physical and logical paths for data to travel.

The network cards 206 may include one or more field programmable gate arrays (FPGAs), application specific integrated circuits (ASICs), programmable logic devices (PLDs), programmable logic arrays (PLAs), processors, and other kinds of devices. In addition, the network cards 206 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 206 may support a single communications protocol, may support a number of related protocols, or may support a number of unrelated protocols. One or more network cards 206 or their equivalent may be permanently installed in a self-contained test unit or tests appliance.

Each network card 206 may contain one or more port unit 220. Each port unit 220 may include circuits and software to generate test traffic and/or to receive and analyze test traffic. Each port unit may be coupled to the test administrator 210. Each port unit 220 may connect to the network 290 through one or more ports. Each port unit 220 may be connected to the network 290 through a communication medium 295, which may be a wire, an optical fiber, a wireless link, or other communication medium. Each port unit 220 refers to a module within the network test equipment that connects to the DUT 250 at a port along either the N-S communication axis or the E-W communication axis. Each port unit 220 connected to the DUT may be both a source of test traffic and a destination for test traffic. Each port unit 220 may emulate a plurality of logical source and/or destination addresses. Each port unit 220 may emulate a plurality of network users, clients, peers, servers, or other network devices.

The backplane 204 may serve as a bus or communications medium for the network cards 206. The backplane 204 may also provide power to the network cards 206.

The device under test 250 may be any device capable of communicating over the network 290. The device under test 250 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the device under test 250 may include appliances, alarm systems, and any other device or system capable of communicating over a network.

The network test equipment 200 may also include a test administrator 210, which may be the test administrator 110 of FIG. 1. The test administrator 210 may be a computing device included within or coupled to the chassis 202. The test administrator 210 may include an operator interface (not shown) that may be used to plan a test session, to control the test session, and/or to view test results during and after the test session. The operator interface may include, for example, a display and a keyboard, mouse, and/or other input devices (not shown). The test administrator 210 may include or be coupled to a printer or other data output device (not shown) for output of test results. The test administrator 210 may include or be coupled to a storage device (not shown) for storing test data and results for future review and/or analysis.

The network traffic on network 290 and produced and received by various nodes, including the ports on the network cards 206 includes both control plane traffic and data plane traffic. The control plane and data plane are virtualizations that are useful in conceptualizing the roles of two kinds of network traffic. Control plane traffic includes packets that implement the various supported communications protocols, including administrative communications among nodes to maintain communications among the nodes. An example of control plane traffic are routing notices or packets informing a second node that a first node is inaccessible. Data plane traffic includes packets carrying data between nodes. The data plane carries network traffic that communicates data over a network. For example, those packets that carry data for an audio stream are considered to be communicated over the data plane and are considered data plane traffic.

Figure 3:
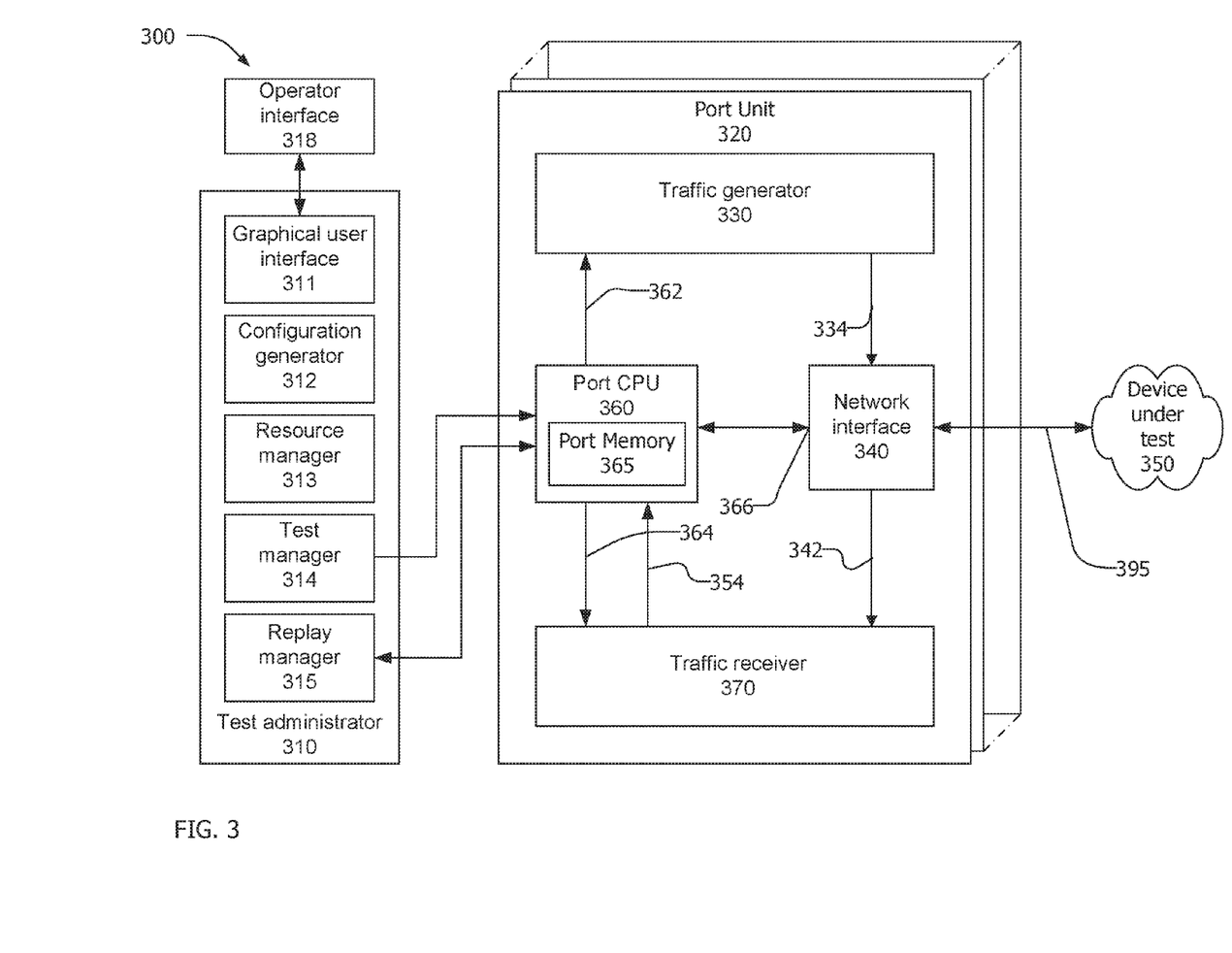
FIG. 3 is a block diagram of a test environment.

Referring now to FIG. 3, a test system 300, which may be the network test equipment 300 may include a test administrator 310 coupled to a plurality of port units including an exemplary port unit 320. The port unit 320 may include a port central processor unit 360 (CPU), a traffic generator unit 330, a traffic receiver unit 370, and a network interface unit 340 which couples the port unit 320 to a device under test 350. The port unit 320 may be all or part of a network card such as the network cards 206.

The port CPU 360 may include a processor (not shown), a memory 365 coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices. The memory 365 may include random access memory, or a combination of random access memory and other memory such as read-only memory and flash memory. The memory 365 may store both data and program instructions for execution by the processor.

The memory 365 may include a received packet buffer. The received packet buffer may have capacity to store at least the longest anticipated received packet. The received packet buffer may have capacity to store multiple packets. A traffic receiver 370 may write one or more received packets into the received packet buffer, for example using direct memory access. After each received packet is stored, the traffic receiver 380 may send a signal (such as an interrupt, a flag, or another signal) to the processor 360 indicating that a received packet is waiting in the received packet buffer.

The memory 365 may include a transmit packet buffer. The transmit packet buffer may have capacity to store at least the longest anticipated packet to be transmitted. The transmit packet buffer may have capacity to store multiple packets. The processor 360 may write one or more packets to be transmitted into the transmit packet buffer. After each packet to be transmitted is stored, the processor 360 may send a signal (such as an interrupt, a flag, or another signal) to a traffic generator 330 indicating that a packet to be transmitted is waiting in the transmit packet buffer. The traffic generator 360 may then extract the packet to be transmitted from the transmit packet buffer, for example by direct memory access.

Programs stored in the memory 365 may include a TCP layer program that causes the processor to open, manage, and close TCP connections with device under test 350. The TCP layer program may be a layer within a TCP/IP protocol stack operating on the port CPU. The port CPU may be configured to maintain a large plurality of concurrent TCP connections with the device under test 350, and may open a million or more TCP connections during a network test session. For each TCP connection, the processor may send packets via a buffer in the memory 365 and the traffic generator 330, and may and receive packets via the traffic receiver 370 and a receive buffer in the memory 365. For each TCP connection, the processor may store TCP connection data in a TCP connection memory within the memory 365. The stored TCP connection data may include, for example, the state of the connection, the highest sequence number transmitted, and the highest sequence number acknowledged.

Programs stored in the memory 365 may also include a capture routine that causes the processor 360 to capture selected packets from each session. The captured packets may be extracted and stored in a capture memory 340 within the memory 365.

The port CPU 360 may provide the traffic generator unit 330 with stream forming data 362 to form a plurality of streams. The stream forming data 362 may include, for example, the type of packet, the frequency of transmission, definitions of fixed and variable-content fields within the packet and other information for each packet stream. The traffic generator unit 330 may then generate the plurality of streams in accordance with the stream forming data 362. The plurality of streams may be interleaved to form outgoing traffic 334. Each of the streams may include a sequence of packets. The packets within each stream may be of the same general type but may vary in length and content.

The network interface unit 340 may convert the outgoing traffic 334 from the traffic generator unit 330 into the electrical, optical, or wireless signal format required to transmit the test traffic to the device under test 350 via a link 395. The link 395 may be a wire, an optical fiber, a wireless link, or other communication link. Similarly, the network interface unit 340 may receive electrical, optical, or wireless signals from the network over the link 395 and may convert the received signals into incoming traffic 342 in a format usable to the traffic receiver unit 350.

The traffic receiver unit 370 may receive the incoming traffic 342 from the network interface unit 340. The traffic receiver unit 370 may determine if each received packet is a member of a specific flow, and may accumulate test statistics for each flow in accordance with test instructions 364 provided by the port CPU 360. The accumulated test statistics may include, for example, a total number of received packets, a number of packets received out-of-sequence, a number of received packets with errors, a maximum, average, and minimum propagation delay, and other statistics for each flow. The traffic receiver unit 370 may also capture and store specific packets in accordance with capture criteria included in the test instructions 364. The traffic receiver unit 370 may provide test statistics and/or captured packets 354 to the port CPU 360, in accordance with the test instructions 364, for additional analysis during, or subsequent to, the test session. The captured packets 354 may be stored in the port memory 365.

The outgoing test traffic and the incoming test traffic may be primarily stateless, which is to say that a substantial portion of the outgoing test traffic may be generated by the traffic generator 330 without expectation of any response and the incoming test traffic may be received by the traffic receiver 370 without any intention of responding. The transmission and reception of stateless traffic may be sufficient to perform layer 2 and layer 3 testing of the device under test 350. However, to test the layer 4 (or higher layer) performance of a network device such as a server or server load balancer, a large number of TCP connections may be required between the port unit 320 and the device under test 350 during a test session.

To establish and use TCP connections, the port CPU 360 may prepare appropriate TCP packets and provide the TCP packets to the traffic generator 330. The traffic generator 330 may insert the TCP packets into the outgoing test traffic. The traffic receiver 370 may separate received TCP packets from received stateless traffic and send the received TCP packets to the port CPU 220 for processing.

Some amount of interactive communications may be required between the port unit 320 and the device under test 350 during a test session. The interactive communications may include, for example, control plane traffic, TCP connections and application-layer transactions. Such traffic may be initiated, managed, and processed by the port CPU 360 and thus may be referred to as "CPU traffic". As shown in FIG. 3, the port CPU 360 may be coupled to the network interface unit 340 such that CPU traffic 366 may be communicated between the port CPU 360 and the device under test 350 via the network interface unit 340. Although not shown in FIG. 3, outgoing CPU traffic may be routed from the Port CPU 360 to the network interface unit 340 via the traffic generator unit 330, and incoming CPU traffic may be routed from the network interface unit to the port CPU 360 via the traffic receiver unit 350.

The port CPU 360 may communicate with a test administrator 310, which in turn may communicate with or include an operator interface 318. The test administrator 310 may be a computing device connected to the port unit 320 via a bus, a network, or another communications path. The operator interface 318 may include at least one display device (not shown) and one or more input devices such as a keyboard, a mouse or other pointing device, and/or a touch screen.

The hardware and software of the test administrator 310 may perform multiple functions including a graphical user interface 311, a configuration generator 312, a resource manager 313, a test manager 314, and a replay manager 315. The configuration generator 312 may develop a test configuration based, at least in part, on instructions and data received from an administrator via the graphical user interface 311 and the operator interface 318. The configuration generator 312 also may send instructions and data to a server to allow the server to allocate the memory required for storing the capture sequences as the capture sequences are being replayed.

The resource manager 313 may manage a catalog of test configuration resources stored in a configuration library (not shown). The test manager 314 may provide the port CPU 360 of each port unit 320 with instructions, parameters, and data required for each port unit to participate in testing the device under test 350 in accordance with the test configuration generated by the configuration generator 312. The instructions and data provided by the test manager 314 to each port unit 320 may include, for example, data enabling or disabling various capabilities and protocols, operational parameters, definitions of packet streams to be generated by the port unit and definitions of performance statistics to be accumulated by the port unit. The replay manager 315 may provide the port the data stored in a capture file that is to be replayed on the network.

Description of Processes

Figure 4:
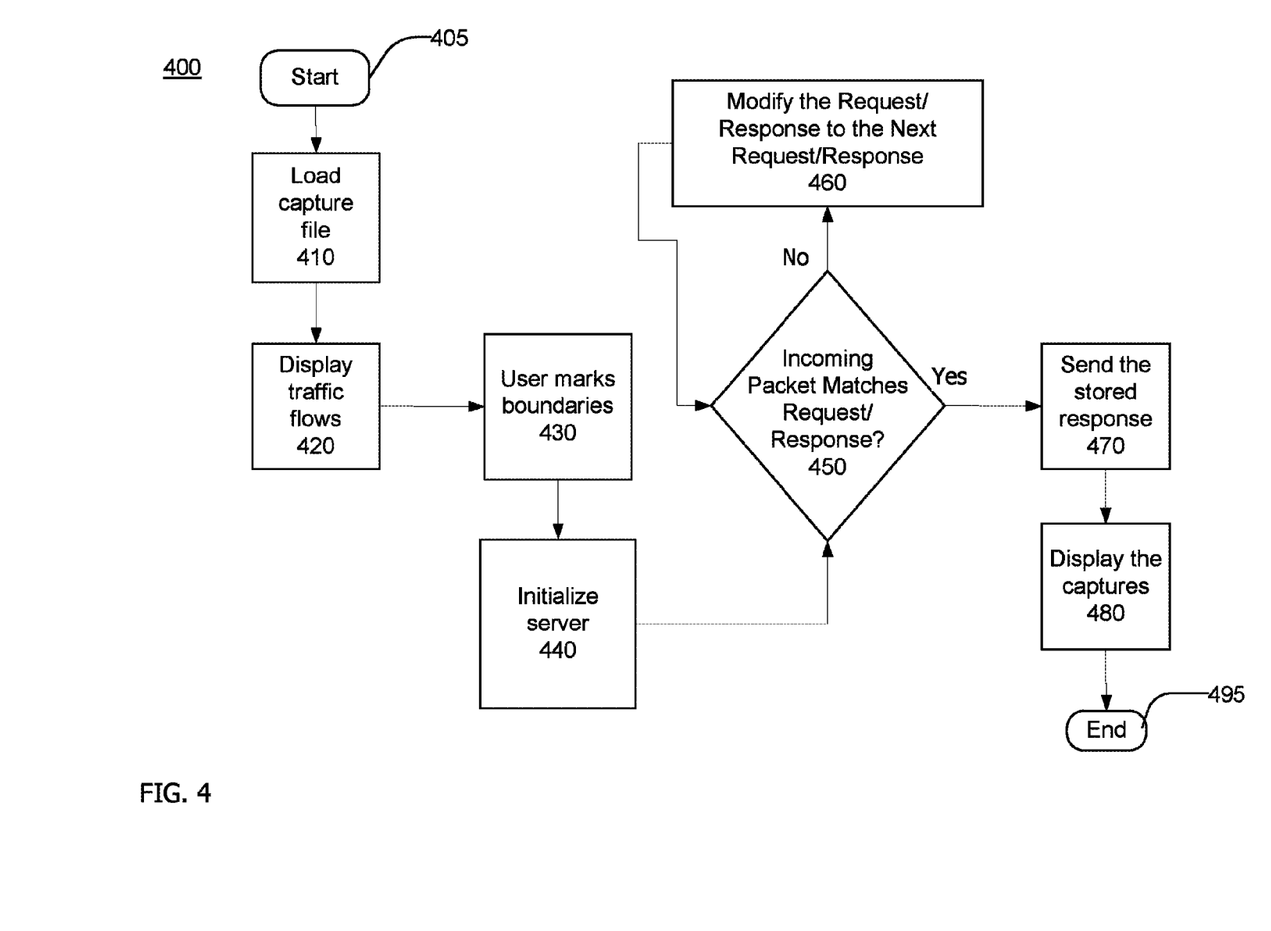
FIG. 4 is a flow chart for replaying captures on a network.

Referring now to FIG. 4, a process 400 for replaying network captures may start at 405 and finish at 495. The process 400 may be executed within a test environment such as that shown in FIG. 2. The process 400 may be performed using a test administrator 210 in conjunction with a plurality of port units 220.

The process 400 may include loading a capture file at 410, displaying traffic flows at 420, marking conversation boundaries at 430, initializing the server at 440, checking whether the incoming packet matches the request/response at 450, modifying the request/response to the next request/response at 460, sending the stored response at 470 and then displaying the captures at 480. For ease of description, these actions are shown to be sequential in FIG. 4. However, these actions may be performed, to at least some extent, concurrently. For example, loading the capture file at 410 and displaying the traffic flows may happen at substantially the same time. Further, the process 400 may be, to at least some extent, cyclic.

The process 400 may begin with the device under test opening a secure connection to a client device. For example, the device under test may open a Secure Sockets Layer (SSL) connection to the client device. SSL is a protocol that provides secure communications over the Internet. The SSL connection will ensure that the data is encrypted as it is transmitted through the network. In addition, the device under test may open a connection to the server which also may be a secure connection. Alternatively, the connection to the server may not be a secure connection. Once the connections are created between the client and the device under test, and also between the server and the device under test, the device under test may forward requests to the server using a connection that already exists.

After the device under test has opened connections to the client and the server devices, the process may load a capture file at 410. An administrator may have initiated a process by selecting a capture file that is stored in the test system. The administrator may use an operator interface, such as operator interface 318 shown in FIG. 3, to select the capture file. The capture file is a file that has stored traffic and data that was transmitted through the system at an earlier time. The capture file includes snapshots of traffic and data that was transmitted on a different system at an earlier time. The system may include a default capture file that was generated by sniffing real-time traffic on the internet. Alternatively, the capture file may be a file of traffic and data transmitted on a different system at an earlier time. The test traffic and the data used to define the test traffic may include, for example, HTTP packets that simulate internet traffic. The capture file is used to replay and regenerate captures stored in the capture file.

The system may display traffic flows at 420 that are retrieved from the capture file. These traffic flows may be represented in a number of ways. For example, for each of a plurality of virtual test devices connected to the device under test, a plurality of actions may be shown in a series of drop-down menus associated with each of the virtual test devices. Alternatively, a graphical symbol for each of the virtual test devices maybe displayed. Activating those graphical symbols may cause the traffic flows to be generated by the associated virtual test devices to be displayed in textual or graphical form. The system may display the traffic flows on a graphical user interface, such as graphical user interface 311 shown in FIG. 3. The traffic flows will include sequences of packets that are stored in the capture file. For example, the administrator may see numerous traffic flows for each of a plurality of virtual test devices, each traffic flow containing multiple HTTP request and response pairs.

After the traffic flows have been displayed, the administrator then selects the conversation boundaries at 430. Specifically, the administrator may select the independent responder sequences that are to be replayed. The administrator may use a graphical user interface to identify the request/response boundaries in the TCP session. For example, the administrator may select a series of virtual test devices or a plurality of traffic flows across a number of virtual test devices for which traffic flows will be replayed. The system creates a logical segregation of the TCP session based on the conversation boundaries selected. Each packet within a conversation boundary is associated with a particular identifier that is stored in the system. The identifier is used to initialize the system at 440.

After the administrator has selected the capture sequences and has marked the transaction boundaries within a TCP session, the server uses the particular identifier generated by selecting to the capture sequences to initialize the server at 440. For example, if the administrator has marked that he wishes to replay 3 request/response pairs, then the server will be initialized to be configured to capture three independent sequences. The administrator can select any number of independent capture sequences to be replayed.

After the server has been initialized, the system will start to replay and regenerate the captures based on the capture file. The packets are replayed exactly according to the capture file. No data is altered or modified in the payload. As packets are being generated and transmitted, the system will check whether any of the packets match the packets that are to be displayed. The system uses the identifier generated at 420 to match the appropriate response packet with the appropriate request packet. Specifically, as the packets are being transmitted, the system will check if an incoming request packet belongs to one of the sequences that were selected to be displayed. If so, then the system will check at 450 whether the incoming request packet is associated with the first responder capture sequences. If it matches the first responder capture sequence or the first transaction sequence, then the server sends the response for this sequence at 470. If it doesn't match the first responder sequence, then at 460, the server iterates and moves on to the next responder capture sequence. In other words, the identifier will be increased to check whether it matches the next responder capture sequence. The system will then return to 450 to check if the incoming request packet belongs to the next responder capture sequence. If so, then the server will send the response at 470. If not, then at 460, the server will modify the request/response pair to the next responder capture sequence. The process continues until all of the responder capture sequences have been traversed. It is evident that the incoming request packet must match with one of the responder captures sequences.

After the server sends the response to the capture sequence at 470, the system will display the captures at 480. Specifically, the system will display the appropriate HTTP request and response pairs together on the graphical user interface. For example, if the administrator chose to see 3 request and response pairs, then the display will show the three request and response pairs and each response packet will be shown along with the appropriate request packet.

Once the capture sequences have been displayed at 480, the process ends at 495. However, the process may continue as it may be a cyclic process.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a blade or other card with a processor in a network testing system. The network testing software may be stored on a volatile or nonvolatile memory device or storage medium included in or on and/or coupled with a computing device, a network testing system, a network card, or other card. The methods may be implemented on one or more network cards in a single network testing system or may be implemented on one or more network cards on each of two or more network testing systems.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for replaying a network capture, comprising:
    loading a network capture file comprising traffic and data that was transmitted on a network at an earlier time, wherein the traffic and data comprise a plurality of traffic flows comprising a sequence of packets;
    displaying, on a graphical user interface, at least one traffic flow comprising a sequence of packets, wherein the sequence of packets comprises a plurality of request packets and a plurality of response packets;
    selecting at least one request packet and one response packet from the traffic flow;
    initializing a server to store the at least one request packet and at least one response packet when it is replayed, wherein the server allocates enough memory to store the request packet and the response packet;
    replaying the traffic flow comprising the selected request packet and selected response packet; and
    displaying the selected request packet and the selected response packet on a viewer when the selected request packet and the selected response packet are transmitted to the server on the network.

2. The method of claim 1, wherein as the traffic flow is replayed, determining whether the incoming request packet matches the response packet.

3. The method of claim 2, further comprising selecting a second request packet from the traffic flow that is displayed on the viewer.

4. The method of claim 2, wherein the response packet that matches the request packet is transmitted on the network.

5. The method of claim 1, displaying the selected packet and the second selected packet.

6. The method of claim 1, wherein the selected packet is an Internet Message Access Protocol (IMAP) packet.

7. The method of claim 1, wherein the selected packet is a Simple Mail Transfer Protocol SMTP packet.

8. A system for replaying a network capture, comprising:
    a server device comprising;
    a processor;
    a memory;
    wherein the processor and the memory comprise circuits and software for
        loading a network capture file comprising traffic and data that was transmitted on a network at an earlier time, wherein the traffic and data comprise a plurality of traffic flows comprising a sequence of packets;
        displaying, on a graphical user interface, at least one traffic flow comprising a sequence of packets, wherein the sequence of packets comprises a plurality of request packets and a plurality of response packets;
        selecting at least one packet from the traffic flow to display on a viewer;
        initializing a server to store the selected packet when it is replayed, wherein the server allocates enough memory to store the selected packet;
        replaying the traffic flow comprising the selected request packet and the selected response packet; and
        displaying the selected request packet and the selected response packet on a viewer when the selected packet is transmitted to the server on the network.

9. The system of claim 8, wherein the selected packet is a Hyper Text Transfer Protocol (HTTP) packet.

10. The system of claim 9, further comprising selecting a second packet from the traffic flow that is displayed on the viewer.

11. The system of claim 10, displaying the selected packet and the second selected packet.

12. The system of claim 11, wherein the selected packet is an Internet Message Access Protocol (IMAP) packet.

13. The system of claim 12, wherein the selected packet is a Simple Mail Transfer Protocol (SMTP) packet.

* * * * *